United States Patent [19]

Barley et al.

[11] Patent Number: 4,673,940

[45] Date of Patent: Jun. 16, 1987

[54] DETECTION OF VIBRATING TARGET SIGNATURES

[75] Inventors: Thomas A. Barley; Tony D. Hodgens; Gustaf J. Rast, Jr., all of Huntsville, Ala.

[73] Assignee: The United States of America as represented by the Secretary of the Army, Washington, D.C.

[21] Appl. No.: 447,077

[22] Filed: Nov. 18, 1982

[51] Int. Cl.[4] .............................................. G01S 13/50
[52] U.S. Cl. .................................... 342/192; 342/104; 342/175
[58] Field of Search ................. 343/5 R, 5 SA, 5 PD, 343/7.7, 17.1 R, 8; 342/192, 104, 175

[56] References Cited

U.S. PATENT DOCUMENTS 3,525,976 8/1970 Wilcox et al. ........................... 343/8
4,484,193 11/1984 Bellew ............................... 343/5 SA Primary Examiner—T. H. Tubbesing
Assistant Examiner—Gilberto Barrón, Jr.
Attorney, Agent, or Firm—Freddie M. Bush; Robert C. Sims

[57] ABSTRACT

This radar system can be used as an independent entity or as an addition to an operating radar system for acquiring additional data from a radar target's returned signal that is not currently being utilized. The system is to separate the amplitude modulation and frequency modulation sidebands created by the target's surface motion or vibration into independently useable entities. The system measures near carrier AM and FM noises, together with techniques for integrating these elements into a working radar system.

1 Claim, 15 Drawing Figures

DETECTION OF VIBRATING TARGET SIGNATURES

DEDICATORY CLAUSE

The invention described herein may be manufactured, used, and licensed by or for the Government for governmental purposes without the payment to us of any royalties thereon.

DESCRIPTION OF THE BEST MODE AND PREFERRED EMBODIMENTS

It has been recognized for years that more data is contained in a radar return signal from a target than is being used effectively. A general approach is defined for extracting a large portion of the information that has previously been discarded or not properly utilized. The fundamental principles involved are essentially the same ideas that are used in implementing devices to measure near carrier AM and FM noise, together with techniques for integrating these elements into a working radar system. Since the availability of this new and novel information will spawn an entirely different approach to how a target might be acquired, identified and tracked, the method described herein will be restricted to the process of separating the sideband data and not in what manner the data might be utilized.

Figure 1:
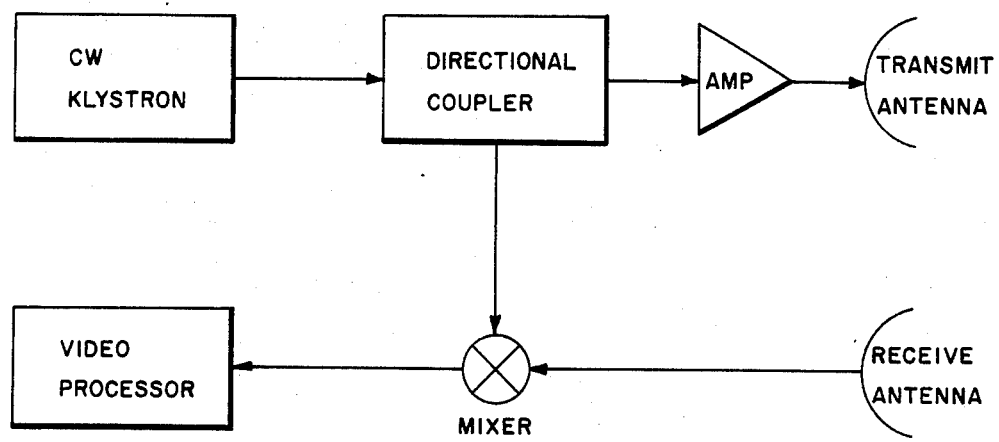
FIG. 1 is a block diagram of a homodyne mixing process.

It has been a desired goal in the field of Radar Technology for a number of years to evolve the data processing capability necessary to permit a radar to identify targets based upon the data immersed in the signal returned from the target. This problem has been attacked from many viewpoints with very little success. One approach is to utilize a technique similar to the arrangement shown in FIG. 1. This technique is basically a Homodyne mixing process that immediately converts the radar signal from the radio frequency/(RD) domain to a baseband frequency domain. The Homodyne technique is plagued with several inherent problems that have not been circumvented to date. These problems are:

(1) The separation of Amplitude Modulation (AM) sideband component from the Frequency Modulation (FM) sideband components cannot be accomplished because all phase relationships of these sideband sets are with respect to the RF carrier and the RF carrier is destroyed in the Homodyne mixing process.

(2) The Homodyne system cannot separate sideband sets based upon any fixed scheme because the sideband sets rotate around the RF carrier as a function of the range to the target. Thus a means for establishing quadrature detection relationships has completely eluded successful development.

(3) The homodyne system cannot provide any means for suppression of the AM sideband set or the carrier. This implies a fundamental limitation to the dynamic detection even if the quadrature problem were to be solved. This particular problem is a serious limitation in measurement capabilities of the system because practical test equipment with dynamic ranges on the order of 80 db represent current state of the art.

Figure 2:
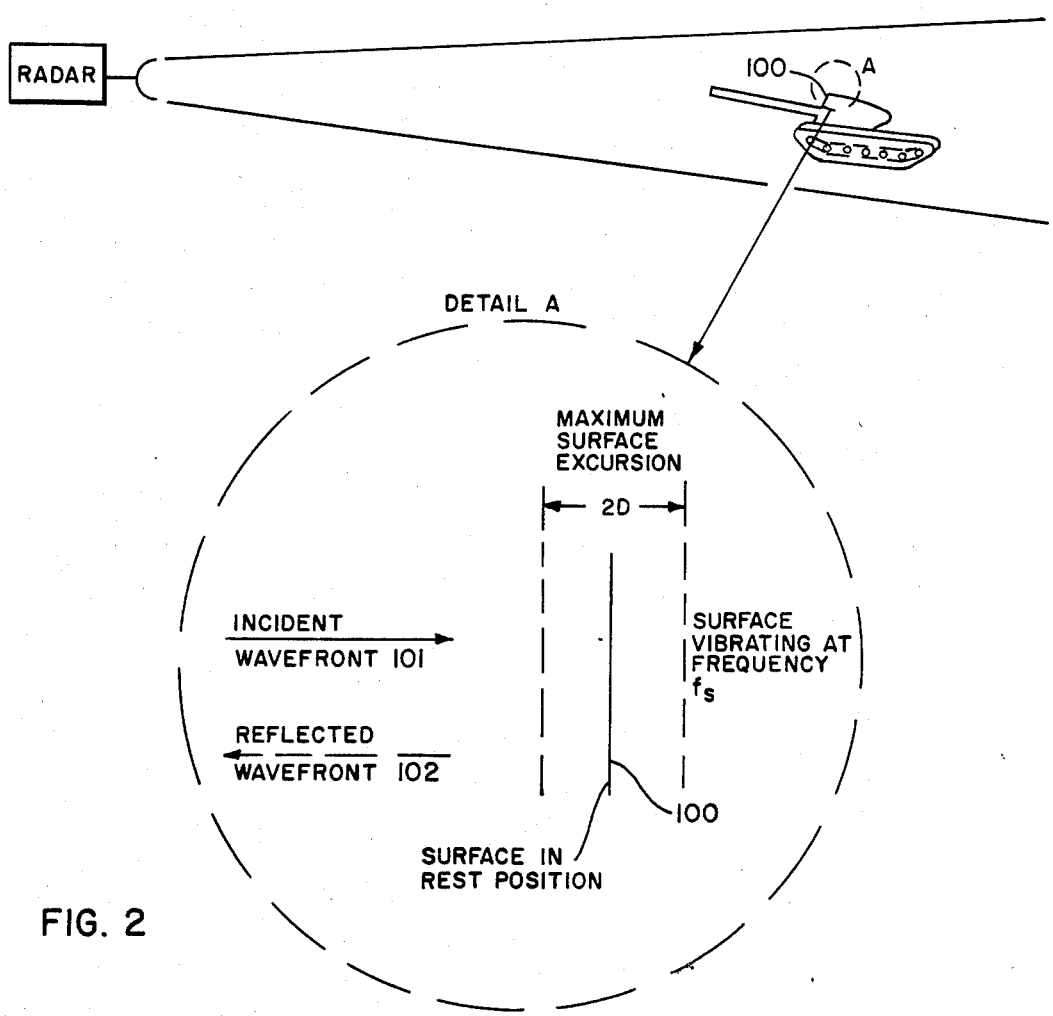
FIG. 2 is a showing of a vibrating surface concept of the present invention.
Figure 3:
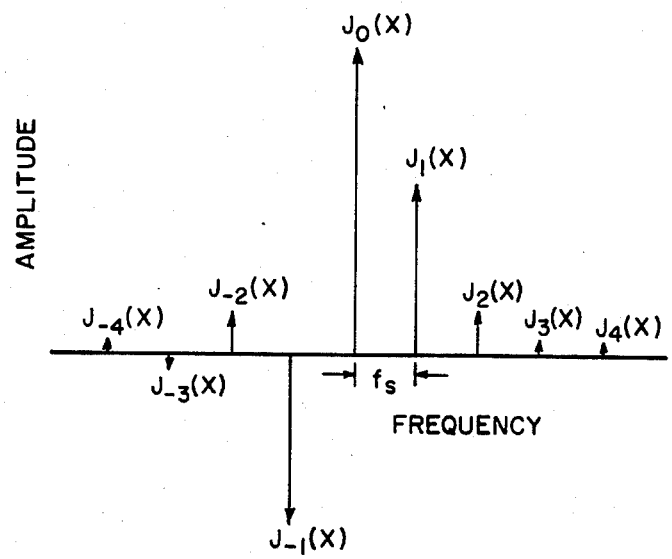
FIGS. 3 thru 5 illustrate sidebands of reflected radar from primary targets of interest.
Figure 4A:
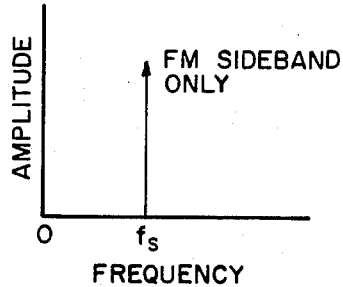
Figure 4B:
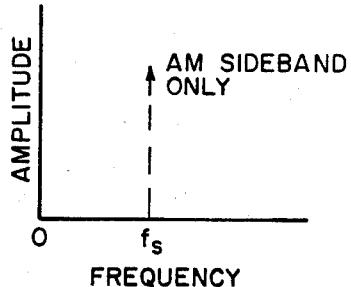
Figure 4C:
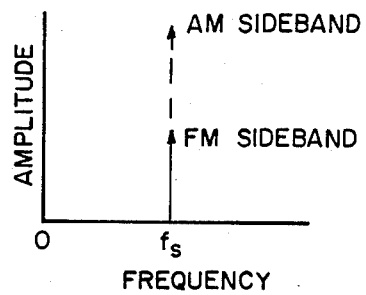
Figure 5:
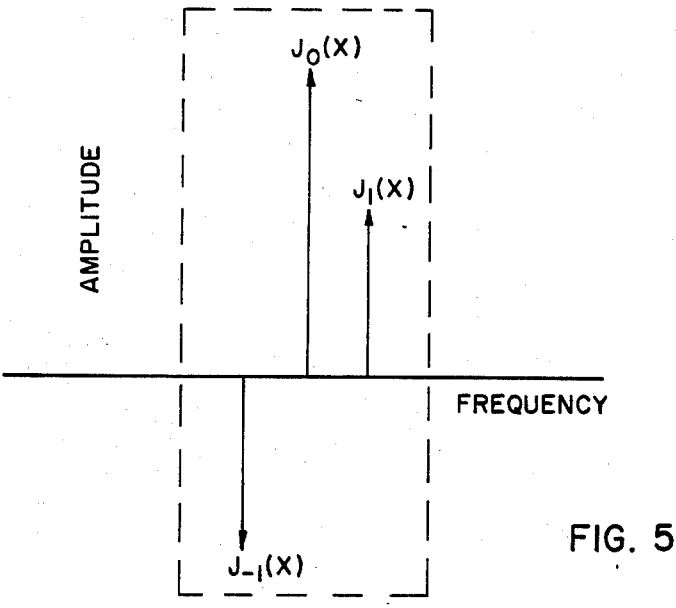

The concept of a vibrating surface is illustrated in its simplest form as depicted in FIG. 2. It can be seen that periodic movement of the basic surface 100 from its rest position will modulate the frequency of the incoming or incident wave 101 and return this modulation with the target return signal 102. FIG. 3 represents the FM frequency spectrum of a signal reflected from such a moving surface when the total distance of movement is large with respect to the wavelength of the transmitted signal. If the homodyne system is used to detect this signal, the resulting baseband spectrum will be folded about the zero frequency $J_o(X)$ which represents the radar carrier. In the homodyne process, the receiver mixer, see FIG. 1, translates the $J_o(X)$ carrier to a DC frequency and folds all sidebands. This operation results in three possible conditions. The detected signal could all be FM sidebands, FIG. 4 (a), it could be all AM sidebands, FIG. 4 (b), or worst of all it could be a combination of the AM and FM sidebands, FIG. 4 (c). Since the range determines the phase position of the signal returned as compared to the signal transmitted, there is no means currently available to establish a fixed phase relationship between the two signals. Based upon limited laboratory measurements and upon theoretical calculations associated with establishing a viable model of the target's modulation, the expected modulation return spectrum from a vibrating target surface is shown in FIG. 5, for most cases of interest.

Figure 6:
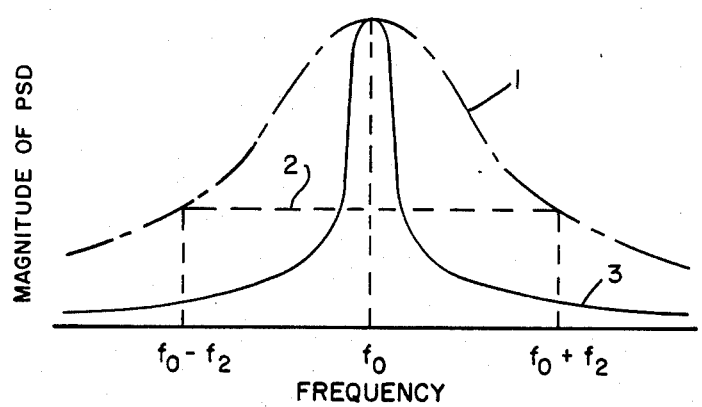
FIG. 6 is a graph illustrating near carrier power spectral density distribution.

Another basic problem for any radar designed to detect vibration on a target surface is the power density spectral distribution near the transmitter center or frequency means. A convenient method of considering the effects of the power spectral density spread in the region of the RF domain near the transmitted carrier frequency is shown in FIG. 6. The horizontal axis represents the frequency and the vertical axis represents the power density at that frequency. Consider a power spectral spread a displayed by curve 1. If the signal return to be detected is bounded by the region of amplitude and frequency contained within rectangular area 2, it is easily seen that the transmitted power density spread will always mask the signals contained within rectangular area 2. In effect, a negative signal to noise ratio exists. It is very unlikely that any system could be successfully designed for that type operation. Consider curve 3 where the power spectral density spread has been reduced through application of stabilization techniques. In this case, there would exist a good signal to noise ratio for signal processing requirements over the entire region except for a small region extremely close to the carrier. It is therefore clear that unless the transmitting source has very tight control exercised over the spectral power distribution very near the carrier, it is not probable that the transmitter would be suitable for detecting target surface vibrations. Power spectral density controls as tight as would be required for detection of vibrating target surfaces are currently in the state-of-the-art, but not in general use. Therefore, this method cannot be implemented on any known radar without some modifications to the radar system.

Figure 7:
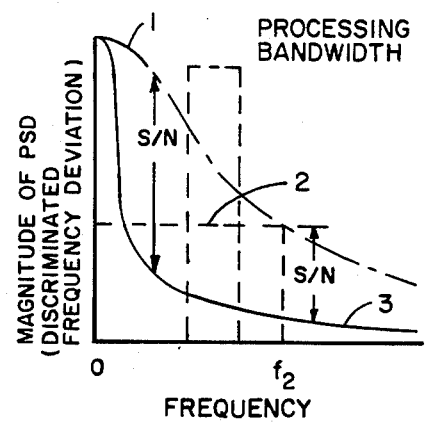
FIG. 7 is a graph illustrating distribution of RF transmitted spectral energy at baseband.
Figure 8:
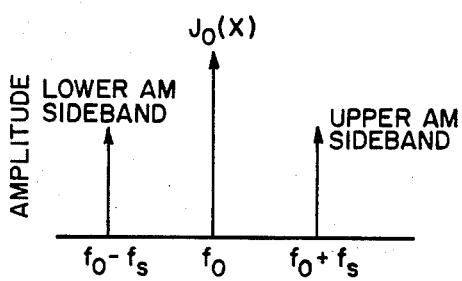
FIG. 8 illustrates the AM sideband structure with modulation less than 100%.
Figure 9:
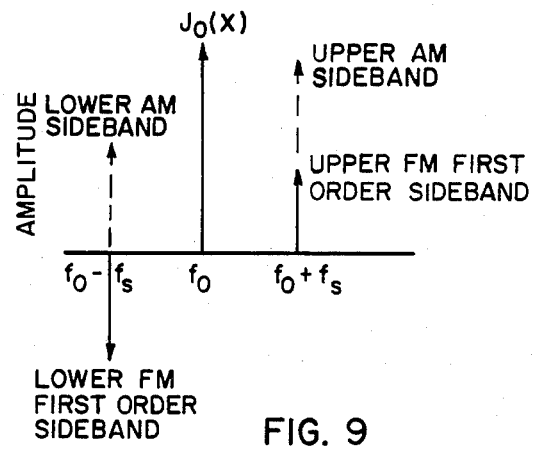
FIG. 9 illustrates the small modulation structure with both AM and FM sidebands.

FIG. 6 presents power spectral data as it would appear at the transmitted frequency. However, at some point in the data processing operation, this data ultimately is reduced to baseband video data. FIG. 7 provides an insight on how the RF transmitted spectral energy is distributed at baseband where curves 1, 2 and 3 are the folded counterpart of FIG. 6. Basically, the discriminated RF spectrum folds around the zero frequency or DC frequency and the entire spectral energy content is folded in an overlapping manner. Another potential problem must also be recognized. FIG. 5, shows the FM sideband structure can likely be predicted from targets with small amounts of surface vibration. The condition depicted by FIG. 9 can distort the vibration modulation structure drastically unless both sideband sets contain identical information. It is interesting to note that cancellation of the lower sidebands in FIG. 9 results in transferring all the modulation power into the upper sidebands. FIG. 8 shows the sideband structure that could be expected from the amplitude modulation of the radar carrier frequency as created by a vibrating target. If the conditions are favorable it is possible that the lower sidebands can, for all practical purposes cancel. FIG. 9 shows the spectrum when the AM and FM sidebands of a carrier that have the proper parameters. The lower sidebands cancel out and the upper sidebands add. This has been observed experimentally.

Figure 10:
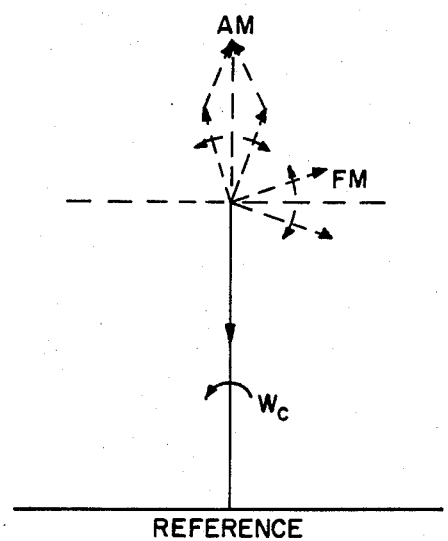
FIG. 10 is a phasor diagram representing AM and FM modulation.

Another method of presenting the modulation sideband structure is with phasor diagrams. FIG. 10 depicts a genreal case wherein a signal $W_c$ the carrier, is modulated with both AM and FM sidebands. Modulation sideband pairs are shown as simple signal sideband pairs for simplicity. The actual sideband structure is very complex when noise is also added. The main points to be made with this phasor diagram are:

(1) The AM and FM sideband structures are in quadrature with each other and in a true linear system would not interfere with each other. However, in practical systems, a certain amount of inference occurs unless special care is taken to control this interference.

(2) In order to detect the FM sidebands, it is necessary to rotate the sideband structures in a manner that interchanges the position of the AM and FM sideband sructures.

(3) If the phasor diagram is traced out for a complete sideband cycle, it can be seen that the AM sidebands travel along the direction of the carrier, $W_c$. The FM sidebands will move the carrier either forward or backward as the sidebands complete one cycle of operation. If the modulation index is small, the carrier amplitude will not be affected by the FM sideband translation. Thus a method has to be employed that allows the FM sidebands to be detected. The method commonly employed is to electrically rotate the AM and FM sidebands 90 degrees. This places the AM sidebands in quadrature with the carrier and the FM sidebands along the carrier phasor line and can now be detected with a simple AM detector.

Figure 11:
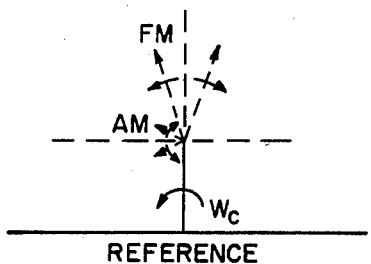
FIG. 11 is a phasor diagram representing suppression of carrier and AM.

(4) One of the key capabilities that permits FM sidebands to be measured at power levels on the order of 120 db below the carrier peak power level is suppression of the carrier amplitude. Current instrumentation capability is limited to measuring dynamic ranges on the order of 80 db. Thus, if a signal 120 db down must be measured, at least 40 db of amplitude suppression is required. Remembering that the AM sidebands are positioned long the carrier it becomes clear that suppressing the carrier suppresses the AM sidebands by the same amount. If the carrier is supressed first, then the FM sidebands rotated, a dynamic range advantage is realized because the suppression operation did not affect the quadrature or FM sidebands. FIG. 11 depicts the concept involved in a qualitative manner. Hence suppressing the carrier has provided two advantages. The improvement of signal detection dynamic range and a method for detecting the FM sidebands by a simple technique.

Figure 12:
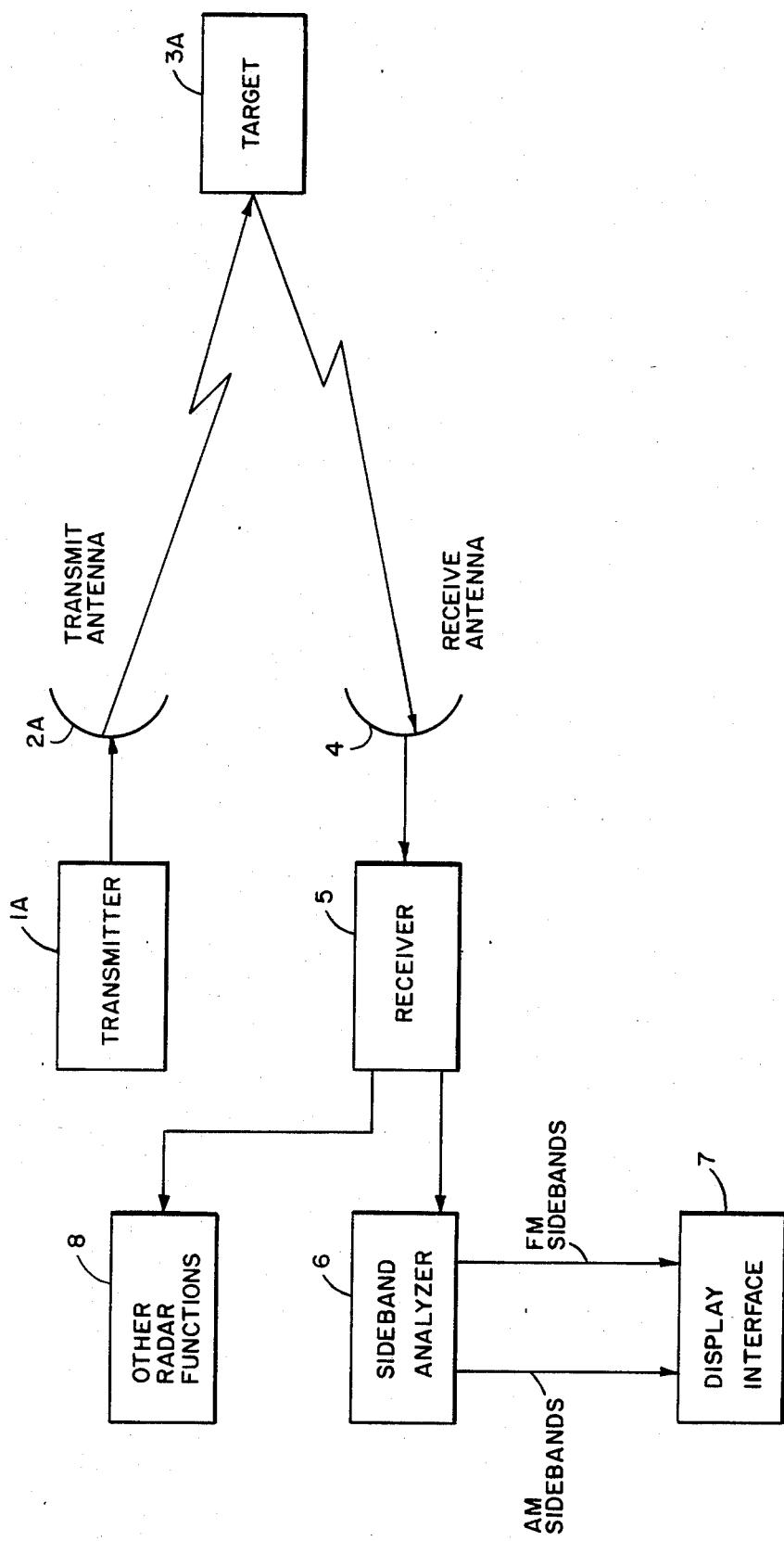
FIG. 12 is a block diagram illustrating a radar system for utilizing target vibration characteristics.

A system that will accomplish the task of extracting data from a target's vibrating surface characteristics for both target identification purposes and to aid in acquiring and tracking of that specific target will be described in general descriptive terms using the information in FIG. 12. This radar detection system for utilizing the vibration characteristics in the acquisition, identification and tracking of a specific target starts with the transmitter 1A. The characteristics of this transmitter are generally the same as that required from many transmitters with exception that the transmitted mean frequency, $f_o$ must be short term stable to the degree required such that the signal will remain in the passband of the discriminator during the processing period. An even more stringent requirement than posed by the mean center frequency of transmission is the requirement depicted by curve 3 in FIG. 6. In order for this system to provide optimum operation against a vibrating target surface, curve 3 must be as close to a line function as possible. (i.e., curve 3 should collapse to the dashed line extending upward from $f_o$ in the limit when the distribution becomes a characteristic function. The other limit, the amplitude of the signal is established by the noise energy distributed across the region of the frequency spectrum being used) The transmitted power required from transmitter 1A is determined basically from the radar range equation requirements plus any margin of power required to compensate for other system losses (i.e. progation attenuation, etc). The required signal is routed to antenna 2A whose basic function is beam forming plus all the other nominal requirements for a functional radar system. The transmitted energy leaves antenna 2A and proceeds to the target 3A. Conceptually, it is only after vibration characteristics in the form of AM and FM modulations are received by the receiving antenna 4 that any of the unique properties of the target can be utilized. A very important phenomena occurs at target 3A when the spectrally clean (unmodulated) wavefont impinges on the target surface. The target return not only returns a signal to the radar that depends upon the effective cross-sectional area of the target, but the transmitted signal is also modulated by the target 3A surface movement properties. The manner in which target 3A modulates the impinging wavefront from transmitting antenna 2A causes a distinct modulation spectrum to be formed. Target 3A will generate both AM and FM modulations to be added to the impinging wavefront any time the surface has vibrational movement. The vibration characteristics will be present any time target 3A has surface motion. In the case of a moving target, the vibration modulation will move with the doppler return.

The radar return signal from target 3A is received by receiver antenna 4, and routed to receiver 5. Receiver 5 which is basically an amplifier for sideband analyzer 6, can do any required function nominally done by a radar receiver, but it has the stringent requirement in the case of target 3A surface vibrations to amplify these modulations without inducing any significant distortion that cannot be removed in the separation of the modulation sidebands from the returned signal. Additionally, this reciver must provide a means of compensating for target velocity.

Sideband analyzer 6 represents the heart of the operation as far as being able to remove the sidebands from the returned signal is concerned. Sideband analyzer 6 (such as the one in U.S. Pat. No. 4,209,786) must accomplish the following functions after receiver 5 has supplied a sufficient power level to operate te sideband analyzer circuitry:

(1) The analyzer must be capable of separating the AM and FM sidebands with acceptable fidelity.

(2) The analyzer must possess the capabiity of accomplishing detection of the FM sidebands. This process is an operation that transforms the sideband structure shown in FIG. 3 to the sideband structure shown in FIG. 4A.

(3) The analyzer must accomplish a suppression of the AM sidebands and the carrier to permit measurement instruments to view the modulation sideband structure with high fidelity at power levels up to 120 db or more below the received signal mean frequency amplitude.

(4) The output waveforms from the sideband analyzer must be properly interfaced with appropriate equipments that can effectively utilize these sidebands.

The separated sideband structure derived from sideband analyzer 6, which contains both the AM and FM sideband sets, are routed to the display/interface 7 for use in accomplishing the functions that support target tracking and target identification.

The received and amplified signal from receiver 5 is also sent to other radar functions 8 permitting the radar to accomplish all the tasks of a basic radar. It is noted that the system as described could be integrated into a radar system as a part of the total radar operation if the requirements described above are attained. It is noted that functional requirements for a radar system are mentioned but not discussed since this embodiment concept requires only certain capabilities from the radar system. Where specific radar requirements exits, to support this particular capabilities, those requirements were addressed.

It should be noted that this embodiment uses a fundamental carrier frequency that does not require many frequency translations. Since changing frequency through mixing and multiplication degrades the near carrier spectral qualities of the basic starting or transmitter frequency, the preferred system contains a minimum of these type operations.

Figure 13:
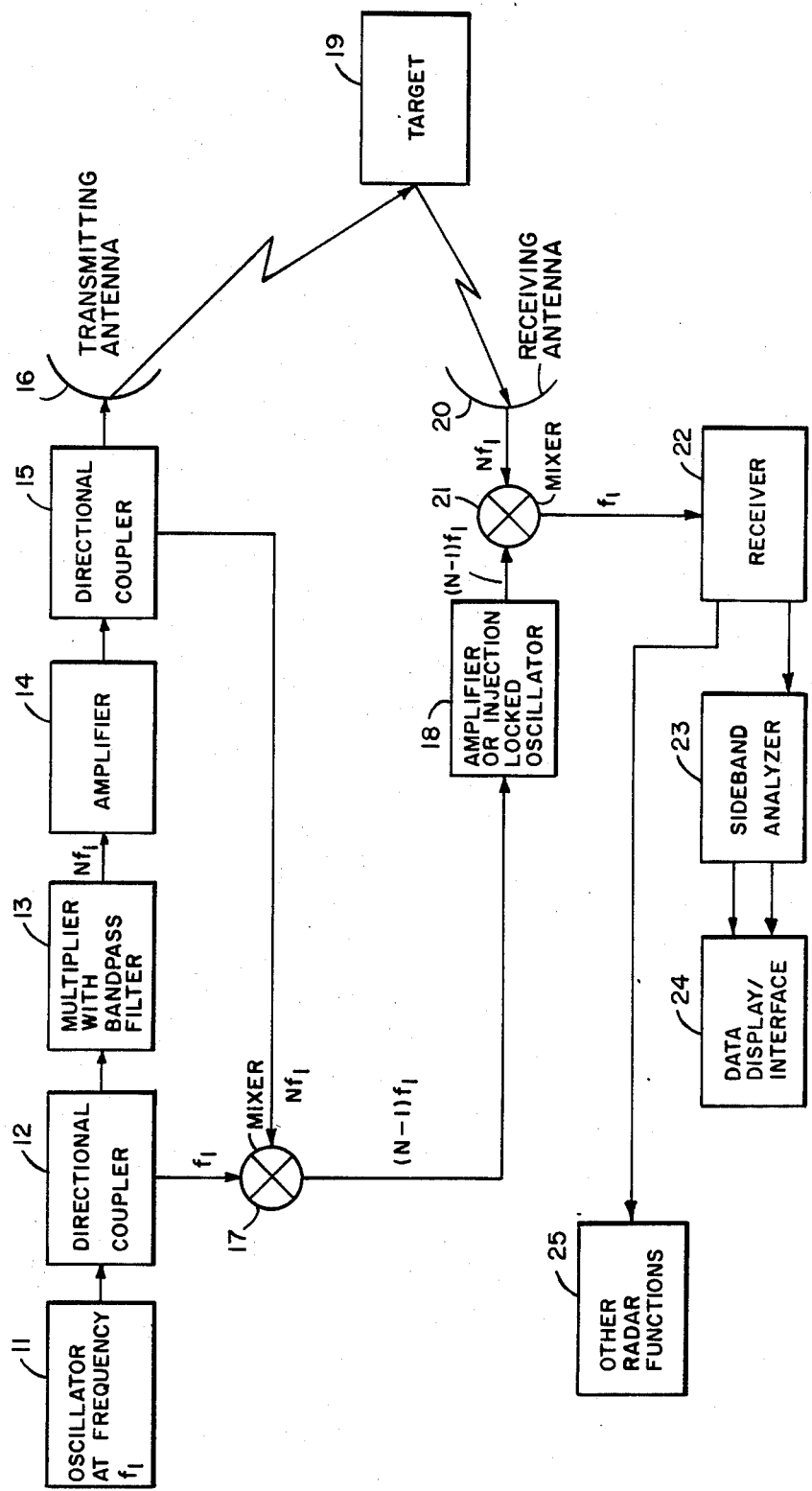
FIG. 13 is an alaternate radar system for utilizing target vibration characteristics.

The basic physical characteristics of certain hardware may suggest requirements that could more suitable be accomplished in another manner. In this case an alternate embodiment as outlined in FIG. 13 can be used.

The requirement for a frequency source oscillator 11 at frequency $f_1$ is basically the same as in the preferred embodiment except this oscillator 11 should have more stringent spectral power density requirements than the basic embodiment to account for signal degradations that occur in the mixing and multiplying operation that utilize the output of oscillator 11 and short term stability compatable with decorrelation due to range delay. The output from oscillator 11 is fed to a directional coupler 12 where part of the signal is used at mixer 17 as a local oscillator source for that mixer, and the remaining signal is routed to multiplier 13. Multiplier 13 contains the hardware required to translate the basic source frequency $f_1$ to a new frequency $Nf_1$. This multiplier 13 operation includes bandpass filtering to limit any spurious anomolies that occur during the multiplication process. The new frequency $Nf_1$ is routed to amplifier 14 to generate the required output power level for system operation. The output signal from amplifier 14 is then sent to a directional coupler 15 where part of the signal is routed to mixer 17 to generate an offset frequency, and the remainder of the signal is routed to transmitter antenna 16, the target 19 and the receiving antenna 20 are identical to the operations as described in the preferred embodiment. The radar return signal from target 19 through receiver antenna 20 is applied to mixer 21 as the $Nf_1$ input of the mixer.

The operation at mixer 17 uses the coupler signal at frequency $f_1$ from directional coupler 15 as the other signal to obtain a mixer 17 output at frequencies $(N+1)f_1$ and $(N-1)f_1$. Either of these outputs could be used as the reference frequency. For purposes of this discussion the frequency $(N-1)f_1$ will be selected to complete the description. The $(N-1)f_1$ sideband is routed from mixer 17 to injection locked oscillator 18 that can supply the correct power levels and frequency at mixer 21 that has a suitable near carrier spectral nature that will permit proper detection of the signal coming from receiver antenna 20. After mixing the signals at mixer 21, the applied signals, $Nf_1$ and $(N-1)f_1$ will generate another sideband pair. One member of this sideband pair will be a signal at $f_1$ that contains the desired target vibration characteristics. The signal output from mixer 21 is applied to receiver 22. Operations including reciver 22, near carrier analyzer 23, data display/interface 24 and other radar function 25 are identical to these same functions described in the preferred embodiment.

We claim:

1. In a radar system having a transmitter transmitting a radar signal towards a moving target and having a detective device for detecting reflected radar signals reflected from said moving target; the improvement comprising a sideband analyzer connected to said detective device so as to have outputs which identify vibration characteristics of the moving target and said sideband analyzer provides for separation of AM sidebands and FM sidebands outputs for identification, acquisition and tracking of the target, a receiving antenna; a first mixer having two inputs and an output; and a radar receiver; a generating device connected to one of the inputs of said mixer; said antenna being connected to the other input of said mixer so as to supply the reflected radar signal from said target to said mixer; said generating device generating a frequency such that when mixed with the signal received by said antenna will produce at the output of said mixer a frequency that contains desired vibration characteristics of the target;

an input of said reciver being connected to the output of said mixer, an output of said radar receiver being connected to said sideband analyzer; said generating device comprises an oscillator; a multiplier having an input connected to an output of said oscillator, an output of said multiplier being connected to said transmitter; a second mixer having a first input connected to the output of said oscillator; a second input of said second mixer being connected to the output of said multiplier; and an output of said second mixer being connected to the input of said first mixer.

* * * * *